United States Patent [19]  [11] 4,376,333

Kanamaru et al.  [45] Mar. 15, 1983

[54] METHOD OF JOINING MEMBERS OF METAL BY FORCED INSERTION

[75] Inventors: Hisanobu Kanamaru, Ibaraki; Moisei Okabe, Tokyo; Akira Tohkairin, Ibaraki; Hideo Tatsumi, Sumiyoshi, all of Japan

[73] Assignee: Hitachi, Ltd., Tokyo, Japan

[21] Appl. No.: 48,734

[22] Filed: Jun. 15, 1979

[30] Foreign Application Priority Data

Jun. 21, 1978 [JP] Japan .................. 53-74258

[51] Int. Cl.³ ................ B23P 11/00; B23P 15/14
[52] U.S. Cl. ................................. 29/432; 29/525; 29/159 R; 403/282; 403/285; 403/359
[58] Field of Search .............. 29/525, 432; 403/359, 403/285, 274, 282

[56] References Cited

U.S. PATENT DOCUMENTS 2,575,481 11/1951 Anderson ................. 403/285
2,869,907 1/1959 Deliso ................... 403/359
3,052,956 9/1962 Daugherty ............... 29/525 X
3,068,508 12/1962 Heyer ................... 29/525 UX
3,084,003 4/1963 Matt et al. ............. 29/525 UX
3,418,012 12/1968 Torre .................... 29/525 X
3,872,578 3/1975 Ullom ................... 29/525

FOREIGN PATENT DOCUMENTS

48-13894 5/1973 Japan .
413829 7/1934 United Kingdom ........ 403/282
433764 8/1935 United Kingdom ........ 403/282

Primary Examiner—Charlie T. Moon
Attorney, Agent, or Firm—Antonelli, Terry & Wands

[57] ABSTRACT

A joining structure comprises a shaft made of metal and a disc of metal more reducible than the shaft. The shaft has arcuate walls defined by a basic circle, and a plurality of projections each projecting from the basic circle and extending along the axis of the basic circle. The projections are spaced from each other so that the arcuate walls are disposed all between the projections. The disc has a hole of the same diameter as the basic circle. The shaft is forcedly inserted into the hole of the disc so that the projections cut into the disc to be rigidly joined to the disc with high concentricity between the shaft and the hole.

5 Claims, 22 Drawing Figures

METHOD OF JOINING MEMBERS OF METAL BY FORCED INSERTION

BACKGROUND OF THE INVENTION

This invention relates to a joining construction and a method of joining metal members, and more particularly to a method suitable for joining a rotary shaft and a rotary member of metal by inserting the former into the latter so that metal flow takes place in a manner creating tight contact between parts thereof.

There is a widely known joint by which a shaft, knurled by rolling a knurling tool on the surface thereof, is forcedly inserted in a smooth cylindrical hole of a member of metal. This joint forms a weak connecting of the shaft to the member and the amount of torque transmissible thereby is low, because projections provided on the surface of the rotary shaft by rolling of the knurling tool each are small in the extent of the projections which cut into the member, and pressure angle of the projection is large. As compared with a conventional joint formed by a sliding fit or pressure fit of an involute splined shaft or a serrated shaft, the joint structure of the knurled shaft is able to obtain only a third as large a transmissible torque as that obtained by the splined or serrated shaft. Further, in the joint of the knurled shaft and the member with a hole, quantities of the projections cutting into an inner face of the hole into which the shaft is inserted are not uniform on the periphery of the shaft. Therefore, substantially high concentricity between the knurled shaft and the hole can not be obtained. The knurled shaft itself is bent a little when knurled, and the knurled shaft is further bent when it is inserted in the hole of the member.

A method of forcedly inserting a shaft of a titanium alloy into holes of aluminum by pressing it, to join the aluminum plates is proposed in Japanese Patent Publication No. 48-13894 (1973). In this method, the shaft is provided with a plurality of lobes each extending axially and arranged on the circumference at equal intervals. The lobes have arcuate mountain portions and arcuate valley portions which alternatively appear and form a continuous surface. The mountain portions and the valley portions each are separated radially from a basic nominal diameter by substantially equal distances. The lobes, which are made by rolling, are in uniform contact with the aluminum plates to prestress them uniformly. The aluminum plates are fastened by a nut which is screwed up by utilizing residual stress in the plates due to compression stress prestressed to the aluminum plates.

In this method, however, the joint cannot be expected to transmit a substantially high torque because the pressure angle is large and the extent of the lobes cutting into the aluminum plate is small. Further, it is difficult to provide a joint with high concentricity between the shaft and the axis of the holes of the aluminum plates, since the dimensions and shapes of the lobes greatly influence the extent to which the lobes cut into the aluminum plate. Therefore, the joint is not suitable for joining a rotary shaft and rotary members together.

SUMMARY OF THE INVENTION

An object of the invention is to provide a joining construction and a joining method, in which mechanically strong fastening between members of metal is completed only by forcedly inserting one of them into the other.

Another object of the invention is to provide a joining construction and a joining method, in which a joint capable of transmitting a large torque is completed between the two members of metal by rigidly inserting one of the members into the other through metal flow of one of the members with little bending.

Briefly stated, the invention is in a joining structure formed by providing a first member of metal having a plurality of projections, each extending axially and projecting from its basic circle at intervals, and a second member which is of metal and more ductile than the first member, and rigidly inserting one of the first and second members into the other so that metal flow of the second member is effected and tight contact between the first and second members takes place at the projections and their adjacent portions of the first member at at least one side of each of the projections. In the tight contact portions of the first and second members, compression is applied, and shearing forces induced in the first and second members when the torque applied is large, whereby the first and second members are joined strongly. Between the projections of the first member, an arcuate surfaces or walls of substantially the same diameter as the second member are provided so that concentricity between the first and second member can be raised.

DESCRIPTION OF THE PREFERRED EMBODIMENTS

Referring to FIGS. 1 to 7, an embodiment of a joining or fastening structure between members of metal according to the invention will be described hereinafter in detail.

Figure 1:
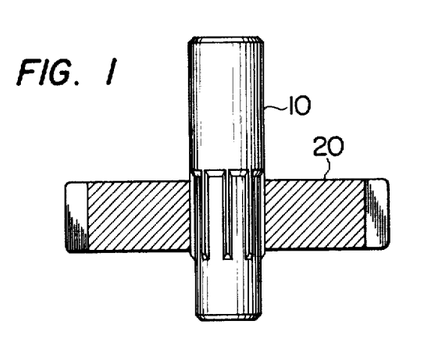
FIG. 1 is a section view of an assembly of a shaft and a gear of an embodiment according to the invention.

In FIG. 1, an assembly of a shaft 10 and a gear 20 is shown as an example of the joining structure.

Figure 2:
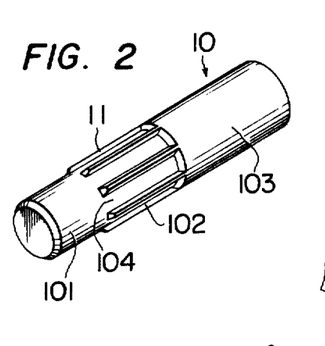
FIG. 2 is a perspective view of the shaft in FIG. 1.
Figure 3:
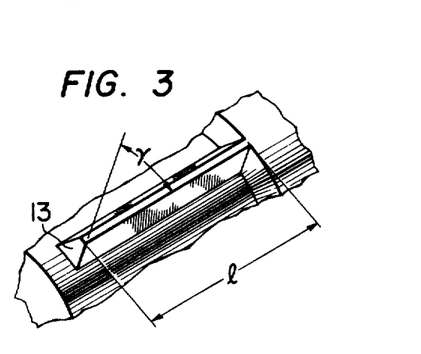
FIG. 3 is an enlarged sectional view of the shaft in FIG. 2.
Figure 4:
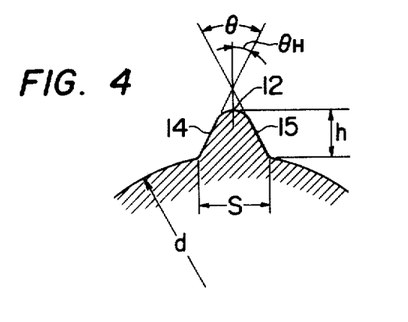
FIG. 4 is an enlarged sectional view of a projection of FIG. 3.

The shaft 10 is solid and formed as shown in FIGS. 2 to 4. Namely, in FIG. 2, the shaft 10 comprises a first cylindrical portion 101, a projection portion 102 and a second cylindrical portion 103. Diameters of the first cylindrical portion and the second cylindrical portion are 12 mm and 12.4 mm, respectively. In the projection portion 102, a plurality of projections 11 are formed. The plurality of projections 11 each project outside of a cylindrical or arcuate wall 104 having the same diameter as the first cylindrical portion 101, and extend axially. A circle defined at the projection portion 102 by the cylindrical wall 104 is called here a basic circle of the projections 11 or simply called a basic circle of the shaft 10.

The plurality of projections 11 each are in parallel to the axis of the shaft 10 and spaced from one another by the same distance. The projections 11 each have a cross section as shown in FIG. 4, namely, the cross section is defined by two inclined faces 14, 15 and a top face 12 which is arcuate. The inclined faces 14, 15 are inclined symmetrically with respect to a radially extending line so that they will cross at an angle $\theta$ and the distance between the inclined faces 14, 15 decrease in a direction toward the top face 12. At an entrance end of each of the projections 11, an inclined face 13, inclined at an inclination angle $\gamma$, is formed. All dimensions of the projection 11 are given as follows;

forcedly inserting length l; 12 mm
bottom length between the inclines 14, 15 S; 0.4 mm
projection height h; 0.2 mm
projection angle (vertical angle) $\theta(=2\theta H)$; 60°
inclination angle $\gamma$; 30°

The projections are formed by extrusion of the shaft 10.

Figure 5:
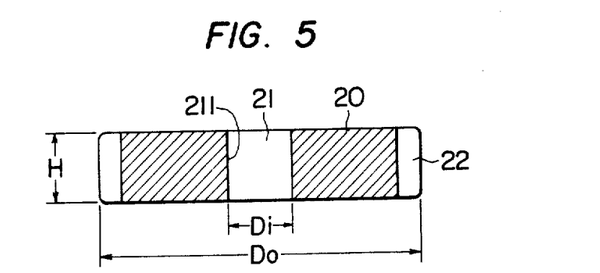
FIG. 5 is a section view of the gear in FIG. 1.

Referring to FIG. 5, the gear 20 is shown. The gear 20 has teeth 22 and a hole 21 which is made at its central portion. The hole 21 is defined by a circular and straight wall 211. The gear 20 has the following dimentions;
thickness H; 12 mm,
outer diameter of teeth $D_o$; 50 mm.

Here, the diameter $D_i$ of the hole 21 is called a basic circle of the gear 20, which is as large as the basic circle of the shaft 10, or larger by a very little.

The shaft 10 is made of structural steel and the gear 20 is made of a steel that is more mild or ductile than that of the shaft 10.

Next, a method of joining the shaft 10 to the gear 20 will be described hereinafter.

The gear 20 is fitted on a setting which has a circular recess, the diameter of which is about 50 mm and slightly larger than the outer diameter of the gear 20. The setting further has a hole at the center of the circular recess, the inner diameter of which is more than 12 mm. On this setting, the gear 20 is fitted so that the gear 20 is not moved radially and vertically.

On the other hand, the shaft 10 is gripped by claws of a hydraulic apparatus with a cylinder and it is set coaxially with the gear 20. The shaft 10 is moved downward by the hydraulic apparatus, with a pressing force of 800 kg being applied. First, the first cylindrical portion 101 of the shaft 10 is inserted into the hole 21 of the gear 20. Second, the entrance portions of the projections 11 of the shaft 10 are forcedly inserted. Since the entrance portion is inclined at an inclination angle of 30°, the projections 11 start to be inserted smoothly into the hole 21 of the gear 20 so that the projections 11 will be contacted tightly with the side wall 211 of the hole 21. Concentricity between the shaft 10 and the gear 20 is raised by smooth guiding of the inclined face 13 of the projections 11 and by making both the basic circles of the shaft 10 and the gear 20 substantially equal. As the shaft 10 runs downward, the entrance portions of the projections 11 cut into the side wall 211 of the gear 20, and finally, the top portions 12 of the projections 11 contacts and then cuts into the gear 20. Portions of the gear 20 in vicinity of the projections 11 of the gear 20 are deformed by the projections 11 through metal flow of the gear 20. Thus, the shaft 10 effects plastic deformation of the gear 20, and the shaft 10 is inserted into the gear 20 while the projections 11 of the shaft 10 and the adjacent portions of the projections 11 are contacting the gear 20.

In case where the shaft 10 is inserted, material of the gear 20 disposed between the projections 11 is deformed outside of the basic circle by a very little, that is, it is deformed so that the basic circle becomes larger. As a result, gaps $\delta$ of 0.02 mm between the shaft 10 and the gear are produced between the projections.

The above joining operation is completed in about 1 second from the time that the shaft 10 and the gear 20 are set.

The joining portion between the shaft 10 and the gear 20 will be described hereinafter referring to FIGS. 6, 7.

Figure 6:
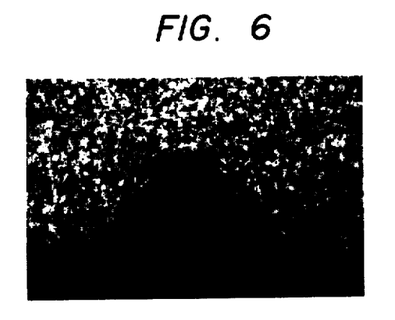
FIG. 6 is a photograph magnified 50 times showing a partial section of the joint in FIG. 1.
Figure 7:
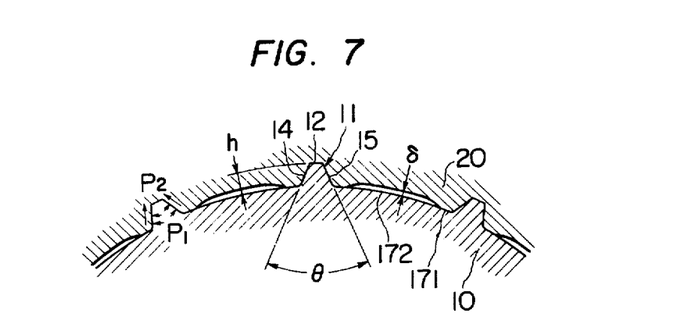
FIG. 7 is a section view of the joint in FIG. 1 for explaining the condition of the joined.

In FIG. 6, the joint or joining portion is shown magnified 50 times by a photograph. It is noted from the photograph that the shaft 10 is fastened characteristically to the gear 20. The characteristics of the joining portions are explained further referring to FIG. 7. Namely, the gear 20 is in tight contact with the top portion 12 of the projections 11, the inclined faces 14, 15 and portions 171 of the basic circle immediately adjacent to the projections 11 of the shaft 10. The shaft 10 and the gear 20 are separated from each other about the basic circle portion 172 between the projections 11, excluding the above-mentioned portions 171. The gap $\delta$ is 0.02 mm as already described above. The height of the projections h is 0.2 mm and does not change after the insertion of the shaft 10 into the gear 20. The reason why this specific joining structure is produced is that the shaft 10, having the projections 11, is made of relatively hard metal, while the gear 20 to be inserted is made of relatively more deformable metal, and the projections each have radially inclined faces 14, 15, and the inclined face 13 at the entrances of the projections 11, and the basic circle of the shaft 10 is substantially the same as one of the gear 20. As shown in FIG. 7, the projection 11 of the shaft 10, and the portion 171 adjacent to the projection 11 receives compression force from the gear 20 when the shaft 10 is inserted into the gear 20, and has large stress applied the interior of the projection 11. The large stress of the projection 11 is applied on the gear 20 at portions of the gear 20 contacting with the top face 12, the inclined faces 14, 15 and the portion 171 adjacent to the projection 11 on the basic circle, to strongly expand the gear 20. Further, shearing force produced by multiplying shearing stress induced in projections 11 of the shaft 10 by shearing area is applied between the top face 12 and the inclines 14, 15, and the gear 20 tightly contacting with the top face 12 and the inclined faces 14, 15 when torque is applied to the shaft 10. The shearing force becomes very large where such a large compression is applied on the projections 11.

Figures 8, 9, 10, 11:
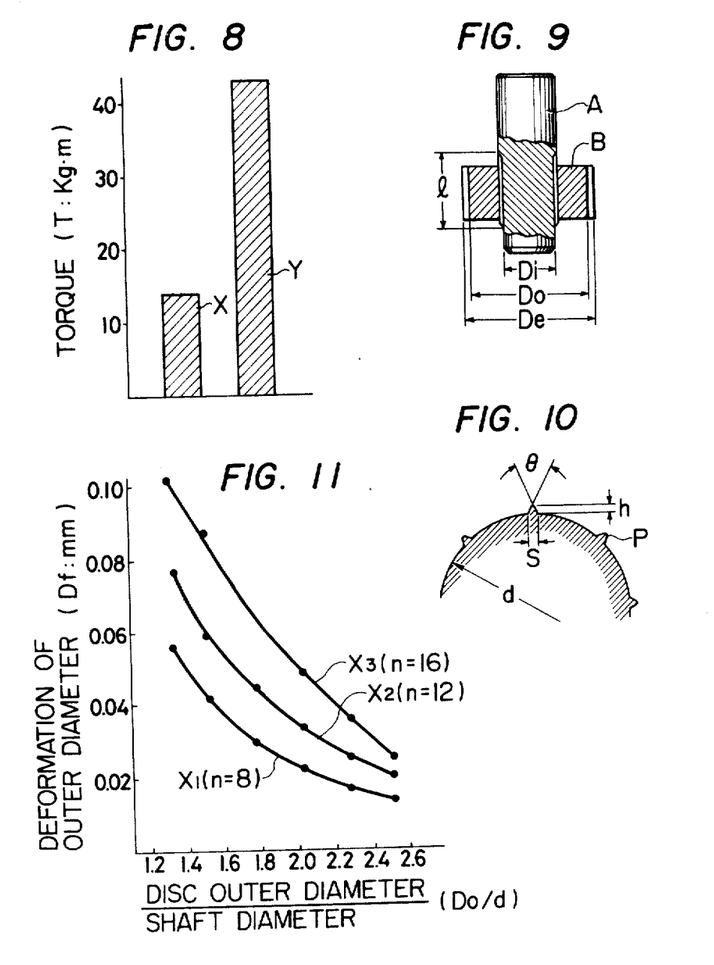
FIG. 8 is a graph showing transmissible torque.
FIG. 9 is a section view of an assembly of a shaft and a disk for explanning its dimensions.
FIG. 10 is an enlarged section view of the shaft shown in FIG. 9.
FIG. 11 is a graph showing a relation between deformation of the outer diameter of a disk and a ratio of the outer diameter of the disk to a shaft diameter.

The above embodiment of the joining structure or joining method according to the invention has the following effects;

(1) The joining structure is mechanically strong, and particularly high torque valves are transmissible. FIG. 8 shows a transmissible torque value Y of the above embodiment of the invention, as compared with a transmissible torque value X due to a conventional press-fit method of a knurled shaft into a hole of a gear. In the conventional press-fit method, the same gear as one used in the above embodiment of the invention is used, and for the knurled shaft, the same kind of metal as the gear 20, and diameter suitable to be inserted in the gear hole are employed. It is noted from FIG. 8 that the joining structure of the above embodiment is 43 kg.m in transmissible torque while that by the above conventional method is 14 kg.m, that is the former joining construction is at least three times as large in transmissible torque as the joining construction by the conventional method.

(2) Since the shaft 10 has the inclined face 13 of 30° from the end of the first cylindrical portion 101 to the projection 11, the projection 11 of the shaft 10 can contact smoothly and tightly with the side wall 211 of the gear 20. By the inclined face 13, concentricity between the shaft 10 and the gear 20 can be raised so that axial movement of the shaft 10 relative to the gear 20 can not be effected, which results in raising durability of the joining construction.

(3) As for the concentricity between the shaft 10 and the gear 20, it is contributed thereto that the basic circle of the shaft 10 is substantially the same in its dimension as that of the gear 20, because the concentricity can be kept high enough by both the basic circles of the shaft 10 and the gear 20.

(4) The shaft 10 is not strained by pressing thereof because the shaft 10 is harder than the gear 20. Therefore, the joining structure, with high accuracy, can be obtained.

(5) The process of manufacturing the joining construction of the shaft 10 and gear 20 is substantially the same as in joining due to the press-fit of a knurled shaft into a gear.

In order to find out the most appropriate joint structure and joining method, various studies on conditions such as kinds of metal to be used, various dimensions relating to the joint structure, number of projections, etc. are taken from various standpoints, the results are as follows;

A shaft and another member to be joined to the shaft which are used for the studies are shown in FIGS. 9 and 10. As the shaft, a shaft A made of structural steel is used, while as the member to be joined to the shaft A, a disc B of mild steel is used. The shaft A is provided with projections P of a number n formed on a basic circle of diameter d and spaced at equal intervals. Various dimentions of the projections P are expressed by the following reference letters which are shown in FIGS. 10, 11;

length of the projection forcedly inserted: l
height of the projection: h
projection angle (vertical angle of the projection): $\theta$
projection bottom length:

As shown in FIG. 9, outer and inner diameters of the disc B are denoted by $D_o$ and $D_i$, respectively. When the shaft A is forcedly inserted into the hole of the disk B, the disc B expands from the diameter $D_o$ to a diameter $D_e$. The difference of the diameter $(D_e-D_o)$ is a quantity of outer diameter deformation and expressed by $D_f$.

In FIG. 11, relations between the deformation $D_f$ of the disc B and ratios of the disc outer diameter to the shaft diameter $D_o/d$, in accordance with the number n of the projections P of the shaft A are shown. In this case, the various dimensions of the shaft A and the disc B are as follows;

$D_i = 12$ mm, $d = 12$ mm, $l = 12$ mm, $h = 0.2$, $\theta = 60$, $S = 0.4$ mm, and only the outer diameter $D_o$ is changed. In this Figure, curves $X_1$, $X_2$ and $X_3$ denote the relations for the projection numbers where n equals 8, 12, and 16, respectively.

It is noted from the result expressed in FIG. 11 that the outer diameter deformation $D_f$ of the disc B increases as the projection number n increases.

Next, transmissible torque of joint structures is studied.

Figure 12:
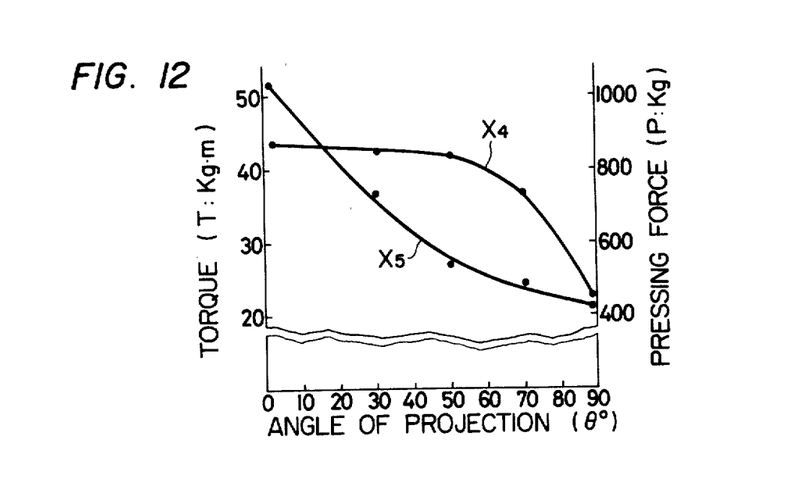
FIG. 12 is a graph showing relations between angles of projections and torque, inserting force.

First, a relation between the transmissible torque T and a projection angle $\theta$ is studied. The experimental results are shown in FIG. 12 wherein the basic circle diameter d of the shaft A is 12 mm, the outer and inner diameters $D_o$, $D_i$ of the disc B are 24 mm, 12 mm, and the forcedly inserting length l, the projection number n, the projection height h and the projection bottom length of the projection of the shaft A are 12 mm, 12, 0.2 mm and 0.4 mm, respectively. In FIG. 12, a curve $X_4$ shows a relation between the projection angle $\theta$ and the transmissible torque T while a curve $X_5$ shows a relation between the projection angle $\theta$ and forcedly inserting force P. It is noted from the experimental result that the projection angle $\theta$ of about 40°~70° is preferable from point of view that substantial transmissible torque can be obtained while requiring a relatively small inserting force.

Figure 13:
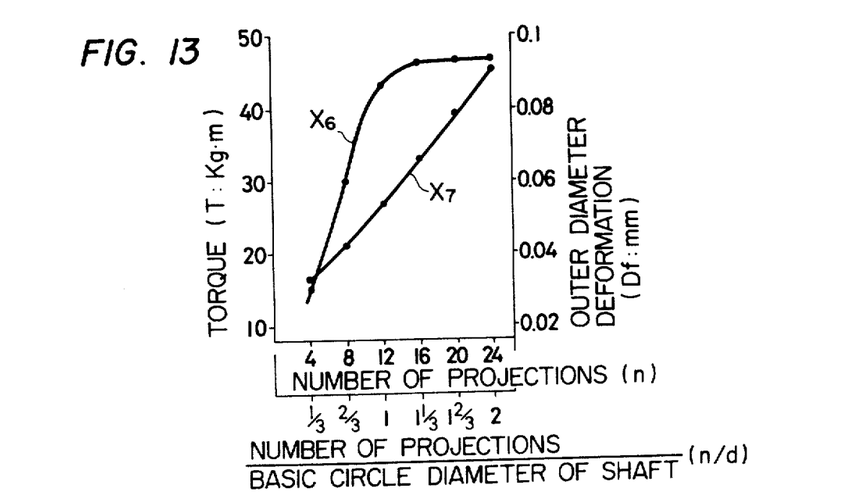
FIG. 13 is a graph showing relations between the number of projections, a ratio of the number to basic circle diameter of a shaft, and torque, outer diameter deformation of the disk.

Further relations between the projection number n and transmissible torque T, the outer diameter deformation $D_f$ are studied on the shaft A and the disc B. In FIG. 13, curves $X_6$ and $X_7$ express of the transmissible torque T and the outer diameter deformation $D_f$, respectively. As various dimensions of the shaft A and the disc B, the following are taken; $d = 12$ mm, $D_o = 18$ mm, $D_1 = 12$ mm, $l = 12$ mm, $h = 0.2$ mm, $\theta = 60°$ and $S = 0.4$ mm.

In these results, the transmissible torque T become constant because, when the projection number n is more than 16, the shaft A is broken or deformed by the torque. Therefore, a projection number of more than 16 is not necessary, and at that number, deformation $D_f$ becomes larger, and bad influence takes place. It is noted that the projection number n of 8~16 is preferable from the standpoint of the value of the transmissible torque T and allowable outer diameter deformaton $D_f$. In this case, the projection number n of 8~16 become $\frac{1}{8}d$~$1\frac{1}{8}d$, using a ratio of the projection number n to the basic circle diameter d mm of the shaft A.

Figure 14:
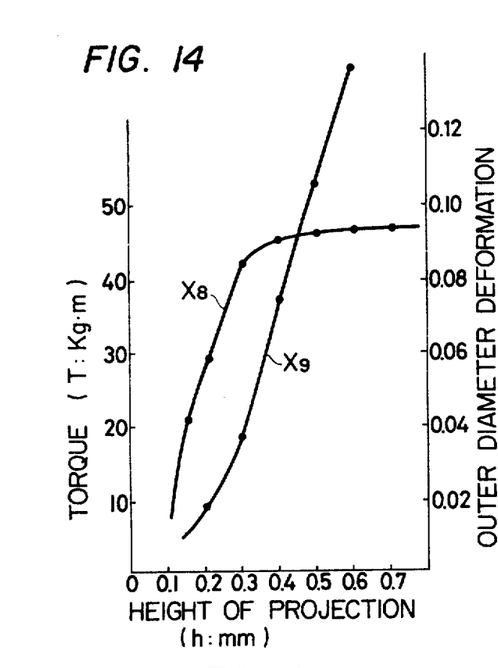
FIG. 14 is a graph showing relations between height of projections and torque, outer diameter deformation.

As for the projection height h of the shaft A, studies from standpoints of torque and deformation of the disk B are taken. The experimental results are shown in FIG. 14 wherein a curve $X_8$ shows a relation between the projection height (h) and transmissible torque T, while a curve $X_9$ shows a relation between the projection height h and the outer diameter deformation of the disk B. Dimensions of the shaft A and the disc B here used are as follows;
the basic circle diameter d of the shaft A: 12 mm
the projection number n: 8
forcedly inserting length of the projection l: 12 mm
the projection angle $\theta$: 60°
the projection bottom length S: 1.5 h
the outer and inner diameters of the disc A $D_o$, $D_i$: 24 mm, 12 mm From the experimental result it is found that in the case where the projection height is more than 0.55 mm, the shaft A is broken or deformed so that the shaft A can not used in practice. Further the deformation $D_f$ of the disc B becomes large in a range beyond the projection height of 0.55 mm. Therefore, the projection height less than 0.55 mm is preferable. On the other hand, from the standpoint of transmissible torque, it is necessary that the height h is more than 0.15 mm. Accordingly, the range of the projection height h is preferably from 0.15 mm to 0.55 mm.

From FIG. 14, it is noted that the transmissible torque T is greatly influenced by the projection height h. Therefore, the projection height h can be decided according to a desired transmissible torque T. For example, when a relatively low value of the transmissible torque T is necessary, as the projection height h a value between 0.15 mm and 0.30 mm is taken, while a value between 0.3 mm and 0.55 mm can be taken when a relatively large transmissible torque is necessary.

When the shaft A with the projections of 0.55 mm height is forcedly inserted into the disc D, the gap $\delta$ defined by the shaft A and the disc B was 0.04 mm.

Further, the projection bottom length S is preferably in a range from 1.3 h to 3 h, wherein h is a height of the projection.

Figure 15:
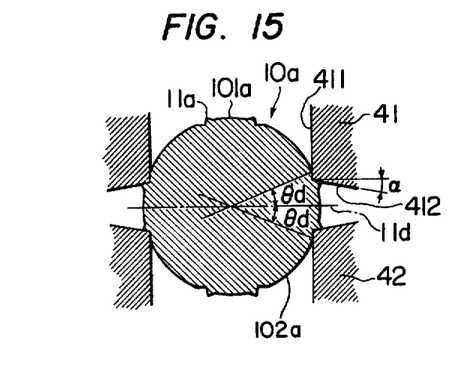
FIG. 15 is a section view of a rotary shaft and dies of another embodiment of the invention.
Figure 16:
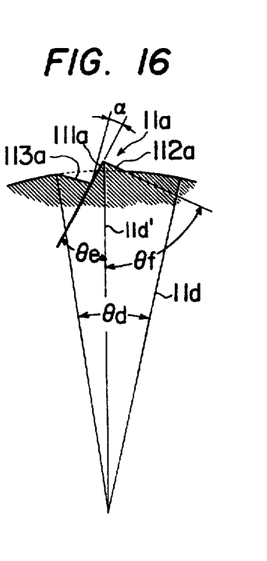
FIG. 16 is an enlarged section view of the rotary shaft in FIG. 15.

Referring to FIGS. 15 and 16, another embodiment of joining construction according to the invention will be described hereinafter in detail.

In FIG. 15, a rotary shaft 10a is provided with a plurality of projections 11a, and is, as a whole, similar to the shaft 10 previously mentioned. As shown in FIG. 16, the projections 11a each are defined by a pressure face 111a a extending from a recess 113a formed in the rotary shaft 11a and a slightly curved face 112a. The pressure face 111a is inclined at an angle of $\theta_c$ to a radial line 11d', and the curved face 112a, inclined at an angle of $\theta_f$ to the radial line 11d'.

Referring back to FIG. 15, one of the projections 11a is paired with another projection 11a, and the two projections 11a are formed symmetrically with respect to a radial line 11d. A plurality of the pairs of projections 11a are spaced from the adjacent pairs at equal intervals. Between the projections are formed arcuate walls or surfaces 101a, and 102a.

The projections 11a are produced by tools 41, 42, such as dies provided on a press machine. The tools 41, 42 each have an edge defined by a side face 411 and a pressing face 412. A tool angle between the side face 411 and the pressing face 412 is $90° + \alpha$. The upper and lower tools 41, 42 are set such that the edges of the tools 41, 42 start to contact with the surface of the rotary shaft 10a at an angle of $\theta_d$ to the radial line 11d when the press is worked. And four of the projections 11a are coined by the press with the tools 41, 42 at the same time so as to project by about 0.2~0.25 mm from the basic circle. After the four projections are produced, the rotary shaft 10a is turned by 90°, and the other four projections are formed by the tools 41, 42. Thus, the four pair of projections are formed on the surface of the rotary shaft 10a at regular intervals.

The rotary shaft 10a is forcedly inserted into a hole 21 of a gear 20 as shown in FIG. 5 in the same manner as previous mentioned.

Figure 17:
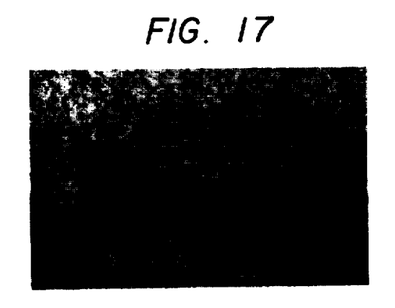
FIG. 17 is a photograph magnified 50 times showing of a partial section of a joining construction using the rotary shaft in FIG. 15.

A condition of the rotary shaft 10a is joined to the gear 20 as shown in FIG. 17 by a photograph magnified 50 times. From FIG. 17, it is noted that the pressure face 111a and the curved face 112a of the projection 11a and part of the cylindrical surface 101a immediately adjacent to the curved face 112a are tightly contacted with the inner face of the hole 21, and the other portions of the rotary shaft 10a are separated from the inner face of the hole 21 to provide a very small gap.

Referring back to FIG. 16, it is noted that the curved face 112a is able to slip relatively easily on the inner face of the hole 21 of the gear 20 when a clockwise torque is applied to the rotary shaft 10a, and the pressure face 111a can bear a force corresponding to the torque, because the curved face 112a forms a large angle $\theta_f$ with respect to a radial line 11d', and the angle $\theta_e$ of the pressure face 111a is small. The angle $\theta_f$ is about 60°, and an angle $\theta_e$ of about 25°~35° is preferable. Further, the arcuate faces 101a, 102a, which are disposed between the projections 11a, serve for making the shearing force of the joint at the gear side stronger because the shearing area of the gear 20 is made larger by the arcuate portion of the gears 20, as compared with a joint of a knurled shaft.

Figure 18:
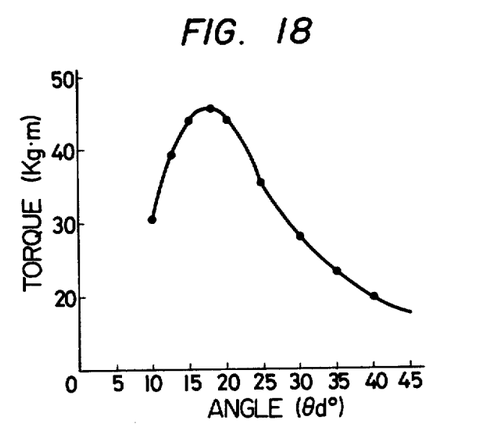
FIG. 18 is a graph showing a relation between torque and an angle $\theta_d$ at which the die starts to contact with the rotary shaft.

The transmissible torque of the joining structure is influenced greatly by the angle $\theta_d$ at which the tools 41, 42 start to contact with the surface of the rotary shaft 10a. In FIG. 18, a relation between the transmissible torque and the angle $\theta_d$ is shown, wherein rotary shafts of diameter 20 mm, and of structual steel and disks of a more ductile steel than that of the rotary shafts are used. At an angle below 10° ($\theta_d$), the projections can not be formed. For a rotary shaft of diameter 20 mm, a transmissible torque above 30 kgm is necessary, considering various manufacturing errors. Therefore, as the angle $\theta_d$, an angle of 12°~25° is preferable.

Figure 19:
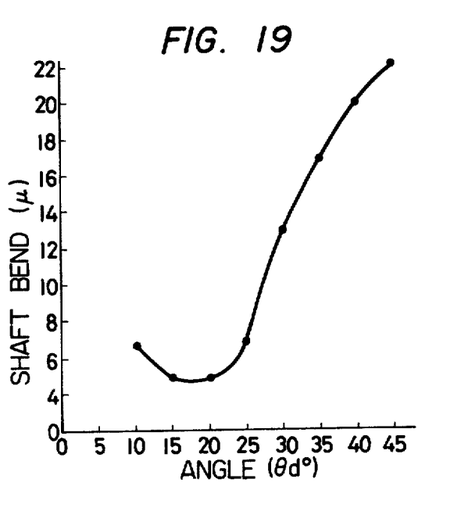
FIG. 19 is a graph showing a relation between bend of the rotary shaft and the angle $\theta_d$.
Figure 20:
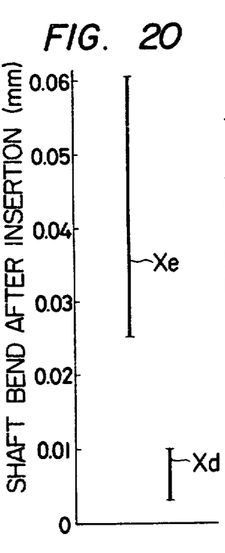
FIG. 20 is a graph of comparative shaft bend after the insertion.

Bending of the rotary shaft 10a must be held within a limit, for example, 10$\mu$. The bending which takes place in the rotary shaft 10a when its projections are formed, varies according to the angle $\theta_d$. This relationship, that is, a relationship between shaft bend and the angle $\theta_d$ is shown in FIG. 19. As apparent from FIG. 19, between values of 10° and 25° for the angle $\theta_d$, the extent to which the rotary shaft 10a is bent is smaller in absolute value and in its change according to the angle $\theta_d$ than at an angle above 25°. Therefore, from the standpoint of shaft bending, an angle $\theta_d$ below 25° is preferable. The shaft bend after the rotary shaft 10a is jointed to the gear 20 is shown in FIG. 20. From the Figure, it is noted that bend $X_d$ of the rotary shaft 10a is 0.01 mm~0.002 mm, while bend $X_e$ of a knurled shaft with similar dimensions is about 0.025 mm~0.06 mm.

Figure 21:
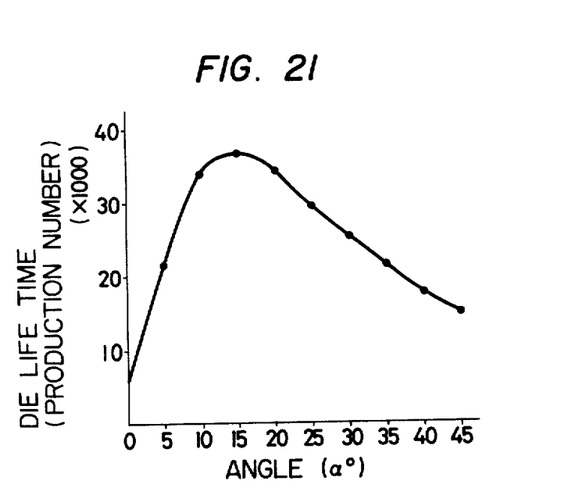
FIG. 21 is a graph showing a relation between die life and an tool angle $\alpha$.

One of important things is life time of the tools 41, 42. According to the experimental results shown in FIG. 21, the life time is influenced greatly by the tool angle $\alpha$. From the results, it is noted that the best angle $\alpha$ is between 10°~20°, and the tool angle $\alpha$ of 10°~25° is preferable. The dies 41, 42 of a material (SKD 11) can produce 30,000 the rotary shafts 10a within its life.

In this method of forming the projections 11a, the reduction of the rotary shaft 10a for forming the projections 11a is relatively small so that the projections 11a can be formed after hardening without the shaft 10a becoming bent to a large extent.

Figure 22:
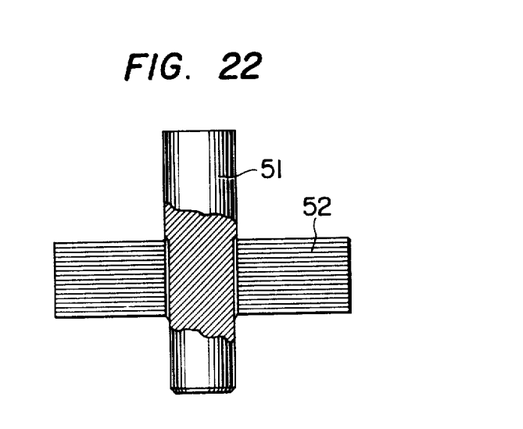
FIG. 22 is a section view of an assembly of a shaft and cores which is an application of the invention.

Referring to FIG. 22, another embodiment of the joint structure will be described hereinafter.

In FIG. 22, a joint structure of laminated cores 41 and a rotary shaft 52 is shown. The cores 52 each have a hole perforated at the center, and the rotary shaft 51 has a plurality of projections similar to the previously described embodiment. The laminated cores 52 each are made of metal more ductile or deformable than that of the shaft 51, and the shaft 51 is forcedly and inserted in the hole of the cores 52 through metal flow. The metal flow takes place at portions of the cores corresponding to the projections and its immediately adjacent portions of the shaft 51. When torque is applied to the shaft 51 a shearing force and compression force are induced in the shaft, so that the torque can be transmitted to the laminated cores 52. The shearing force under the compression is very strong as compared with the shearing force applied when the compression is not applied.

The laminated cores 52 after the joining represent a flat cylindrical face, which enables the shaft 51 to be inserted into the cores 52 with very high concentricity.

It is preferable that a diametrical difference between the shafts 10, 10a, 51 and the gear 20, 20a, disc is 0~0.1 mm.

Projections according to the invention may be provided on an inner face of a hole made in a disc, and a shaft of more reducible metal than the disc is inserted in the disc so that metal flow takes place in the shaft, and the projections cut into the shaft.

In case where the shaft 10, 10a is made of structural steel, as a metal of the disc or gear 20, for example, aluminum, brass, copper, mild steel, etc. can be used.

What is claimed is:

1. A method of joining members of metal by forced insertion, comprising the steps of:
   preparing a shaft with a cylindrical surface;
   forming a plurality of axially extending paired projections projecting radially from the cylindrical surface, with the projections paired together being spaced from each other by an arcuate surface, the paired projections being formed by pressing on the cylindrical surface of the shaft with tools that each have an edge defined by a side face and a pressing face arranged at a tool angle of $(90+\alpha)°$ relative to the side face in a manner so that the edges of the tools start to contact with the periphery of the shaft and an angle $\theta_d$ in a range of 12° to 25° relative to a shaft radius line disposed between the tools and press substantially perpendicularly to said radius line;
   preparing a member of a metal that is more ductile than that of the shaft;
   forming a cylindrical surface within the member of a diameter slightly larger than the diameter of the surface of the shaft; and
   forcedly inserting the shaft within the cylindrical surface of the member in a manner that metal flow takes place in the member so as to provide tight contact of the member with the projections of the shaft.

2. The method as defined in claim 1, wherein the angle $\alpha$ is 10°~25°.

3. The method as defined in claim 1, wherein at least four (4) of the plurality of projections are formed at the same time, and two (2) of the four projections are symmetric to each other with respect to the radius line.

4. The method as defined in claim 1, wherein the rotary shaft is made of a steel and the second member is made of metal that is more ductile than the steel.

5. The method of claim 4, wherein said more ductile metal is one of aluminum, copper, a mild steel and brass.

* * * * *